(12) United States Patent
Scanish

(10) Patent No.: US 11,827,813 B2
(45) Date of Patent: *Nov. 28, 2023

(54) PRESSURE-SENSITIVE PVC COVER STRIP

(71) Applicant: Carlisle Intangible, LLC, Scottsdale, AZ (US)

(72) Inventor: Michael J. Scanish, Camp Hill, PA (US)

(73) Assignee: Carlisle Intangible, LLC, Scottsdale, AZ (US)

( * ) Notice: Subject to any disclaimer, the term of this patent is extended or adjusted under 35 U.S.C. 154(b) by 95 days.

This patent is subject to a terminal disclaimer.

(21) Appl. No.: 16/983,104

(22) Filed: Aug. 3, 2020

(65) Prior Publication Data

US 2020/0362205 A1 Nov. 19, 2020

Related U.S. Application Data

(63) Continuation of application No. 15/992,475, filed on May 30, 2018, now Pat. No. 10,731,057.

(Continued)

(51) Int. Cl.
*C09J 7/50* (2018.01)
*B32B 27/22* (2006.01)
(Continued)

(52) U.S. Cl.
CPC ................. *C09J 7/50* (2018.01); *B32B 27/22* (2013.01); *B32B 27/304* (2013.01); *C09J 7/245* (2018.01); *C09J 7/29* (2018.01); *C09J 7/383* (2018.01); *C09J 7/401* (2018.01); *E04D 5/10* (2013.01); *C09J 123/22* (2013.01);
(Continued)

(58) Field of Classification Search
CPC .............................. E04D 13/15; B32B 27/304
See application file for complete search history.

(56) References Cited

U.S. PATENT DOCUMENTS 5,985,981 A * 11/1999 Alexander ........... C09J 123/283
525/123
6,235,363 B1 * 5/2001 Bilodeau ................ B32B 25/08
428/41.5
(Continued)

FOREIGN PATENT DOCUMENTS

CA 2201258 A1 10/1997
EP 1443158 A1 8/2004

OTHER PUBLICATIONS

U.S. Patent and Trademark Office, Office Action issued in corresponding U.S. Appl. No. 15/992,475, dated Jun. 25, 2019.
(Continued)

*Primary Examiner* — Alexandre F Ferre
(74) *Attorney, Agent, or Firm* — Wood Herron & Evans LLP

(57) ABSTRACT

A PVC-based cover strip designed to bond to non-PVC materials as well as PVC materials includes a PVC layer coated with a barrier effective to prevent migration of plasticizers from the PVC layer. The barrier layer, in turn, is coated with a primer and subsequently a pressure-sensitive adhesive. The barrier layer is generally a polar polymer, such as acrylonitrile rubber which resists migration of phthalate plasticizers. The pressure-sensitive adhesive layer is a pressure-sensitive adhesive suitable for use in roofing applications.

15 Claims, 1 Drawing Sheet

Related U.S. Application Data

(60) Provisional application No. 62/514,173, filed on Jun. 2, 2017.

(51) Int. Cl.
  *B32B 27/30*   (2006.01)
  *C09J 7/24*    (2018.01)
  *C09J 7/29*    (2018.01)
  *C09J 7/38*    (2018.01)
  *E04D 5/10*    (2006.01)
  *C09J 7/40*    (2018.01)
  *C09J 123/22*  (2006.01)
  *E04D 13/04*   (2006.01)
  *E04D 5/12*    (2006.01)

(52) U.S. Cl.
  CPC .... *C09J 2301/302* (2020.08); *C09J 2409/001* (2013.01); *C09J 2413/001* (2013.01); *E04D 5/12* (2013.01); *E04D 2013/0468* (2013.01)

(56) References Cited

U.S. PATENT DOCUMENTS

| | | | |
|---|---|---|---|
| 2006/0251890 A1* | 11/2006 | Lane | C09J 7/22 |
| | | | 428/354 |
| 2008/0038548 A1 | 2/2008 | Clarke et al. | |
| 2011/0056620 A1 | 3/2011 | Barksdale et al. | |
| 2013/0098429 A1 | 4/2013 | Funayama et al. | |
| 2016/0145406 A1 | 5/2016 | Bieber et al. | |

OTHER PUBLICATIONS

U.S. Patent and Trademark Office, Office Action issued in corresponding U.S. Appl. No. 15/992,475, dated Dec. 27, 2019.
U.S. Patent and Trademark Office, Notice of Allowance issued in corresponding U.S. Appl. No. 15/992,475, dated Apr. 29, 2020.
European Patent Office, Extended Search Report issued in EP 21207735.8 dated Feb. 3, 2022.
Chinese Patent Office, Office Action issued in CN 20211053457.9 dated Jul. 13, 2022.
Chinese Patent Office, Office Action issued in CN202110534570.9 dated Mar. 24, 2023.

\* cited by examiner

PRESSURE-SENSITIVE PVC COVER STRIP

CROSS-REFERENCE TO RELATED APPLICATION

This application claims the benefit of U.S. patent application Ser. No. 15/992,475 filed May 30, 2018, now U.S. Pat. No. 10,731,057, which claims priority to U.S. Patent Application No. 62/514,173 filed on Jun. 2, 2017, each of which is expressly incorporated by reference herein in their entirety.

BACKGROUND OF THE INVENTION

In the roofing industry, cover strips are often used to bond two materials together, such as edge strips and roofing membranes. Typically, these are a 6-9 inches wide membrane strips coated with a pressure-sensitive adhesive layer. Traditional PVC roofing membranes contain a liquid phthalate plasticizer that will attack many traditional pressure-sensitive (PS) adhesives in the roofing market. Currently, no manufacturer supplies a PS cover strip product for PVC roofs. This is problematic for dealing with edge metal. Currently all edge metal used with PVC membrane roofs must be PVC coated to allow for non-PS PVC Flashing to be welded to the metal as well as the PVC roofing membrane. This limits the colors available for the metal. Finally, currently there is no easy way to tie-in a PVC roofing membrane to either EPDM or TPO membranes without a curb between the two membranes.

SUMMARY OF THE INVENTION

This invention provides a system of primers and PS adhesive that allows for a PS PVC cover strip to be produced which will adhere to a variety of substrates including PVC and KEE PVC membranes, metal edging, EPDM and TPO roofing membranes. The proposed construction of the PS PVC cover strip utilizes a series of primers that allow for a common roofing PS adhesive to be used with the PVC membranes. The first primer provides a layer of high plasticizer resistance. This prevents the plasticizer from the PVC membrane from attacking the PS adhesive. The second primer prepares the PVC surface for adhesion of the PS adhesive. The PS adhesive must be of significant construction to allow for conformation to step-offs, long-term performance, resistant to standing water and compatible with other common single-ply roofing materials.

DETAILED DESCRIPTION OF THE INVENTION

Figure 1:
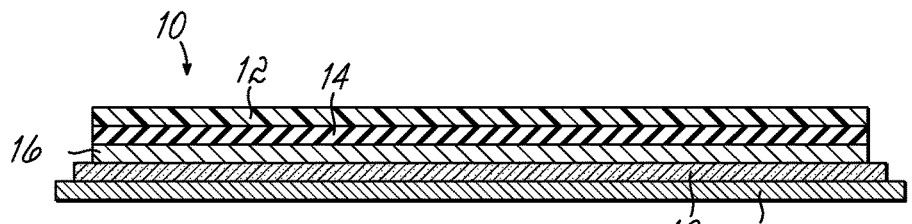
FIG. 1 is cross-sectional view of a cover strip according to the present invention.

As shown in FIG. 1, the present invention is a cover strip 10 which incorporates an upper PVC layer 12 of the type typically used in roofing applications, generally about 60 mils thick. The bottom surface of the PVC layer 12 is coated with a barrier layer 14 which prevents migration of plasticizers from the PVC layer 12. In turn, the barrier layer 14 is coated with a primer layer 16 which is in turn coated with a pressure-sensitive (PS) adhesive layer 18. Finally, the PS layer is covered with the silicone-coated release sheet 22. The cover strip will be 6-12 inches wide, typically 6-9 inches wide.

The barrier layer 14 is a layer that prevents migration of phthalate type plasticizers typically employed in PVC membranes. Generally, the barrier layer will be a polar polymer. One such polar polymer suitable for use in the present invention is an acrylonitrile rubber or NBR which is applied directly to the surface and PVC and allowed to set. Generally, this will be 0.167 mils to 2.5 mils thick.

The composition of the primer will be determined by the composition of the pressure-sensitive adhesive. Generally, the primer will be 0.2 mils to 0.6 mils thick. The pressure-sensitive adhesive can be any pressure-sensitive adhesive typically used in roofing applications such as bromobutyl rubber, pressure-sensitive adhesive and the like. Other suitable pressure-sensitive adhesives may be based on butyl, polyisobutylene, halobutyl, or other suitable polymers. The primer will generally be of a similar composition but with reduced solids content. The primer is simply applied to the barrier layer 14 and allowed to set. Then the pressure-sensitive adhesive layer 18 and release sheet 22 are laminated to the primer layer 16.

Figure 2:
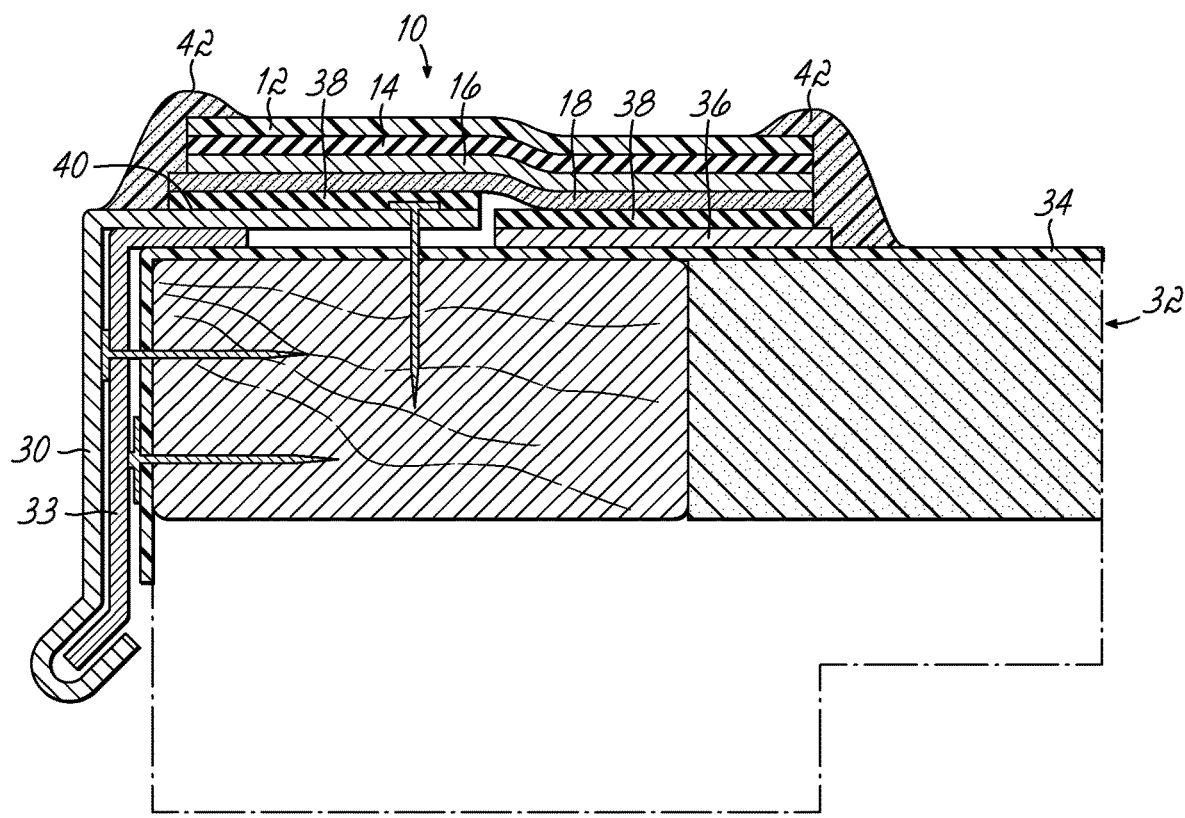
FIG. 2 is a cross-sectional view of the cover strip of the present invention for use with an edge termination.

FIG. 2 shows the use of the present invention to apply a rigid edge member 30 to a roof surface 32 which is covered with a PVC membrane 34. In this application, the PVC membrane 34 is applied to the roof 32 as would be typically done during the roofing application. A connector strip 33 is nailed to a corner of roof 32. The edge termination strip 30 engages to connector strip 33 at one edge and is nailed to the roof 32, trapping the PVC membrane between the roof surface and the edge treatment 30. The edge treatment 30 in this application is not coated with a PVC coating, but rather may be a painted metal surface or the like. Basically, in this application, any non-PVC coated edge treatment can be used.

The cover strip 10 is applied over the edge treatment 30 and over the PVC membrane 34. A strip barrier coating 36 which is generally the same as barrier coating 14 and a primer coating 38 (again the same as primer coating 16 in FIG. 1) are applied to PVC membrane 34. The release sheet 22 is removed from the cover strip 10 and the cover strip 10 applied over the barrier and primer-coated portion of the PVC 34 and directly onto the upper surface 40 of edge treatment 30. Sealants 42 can be applied at either edge of the cover strip 10 to provide a further water barrier but are not necessary. The pressure sensitive-adhesive layer 18 will bond directly to surface 40 of the edge treatment using primer layer 38 and further bonds to the PVC 34, which is coated with a separate barrier layer 36 and separate primer layer 38.

Figure 3:
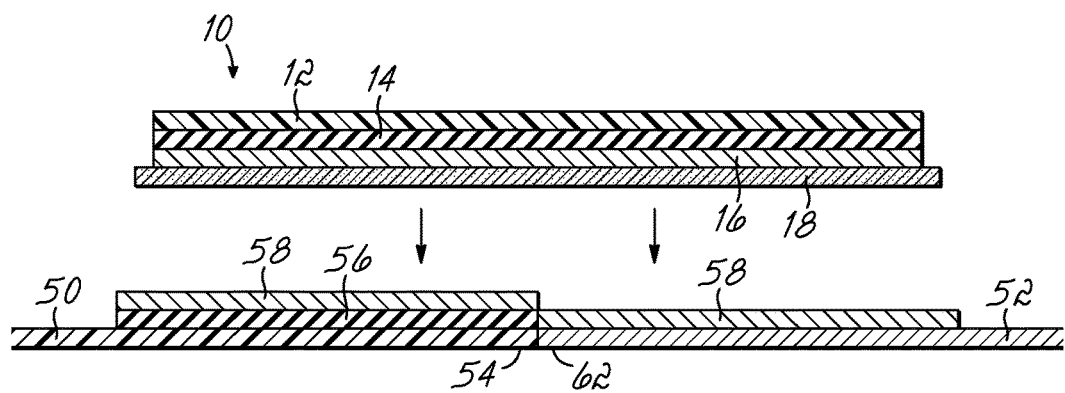
FIG. 3 is a cross-sectional view partially exploded, showing the application of the cover strip to a PVC membrane and a non-PVC membrane.

FIG. 3 shows an alternate use of the present invention in which the cover strip 10 is used to bond a PVC membrane 50 to a non-PVC membrane 52, such as TPO, EPDM or the like. The edge 54 of the PVC membrane 50 is first coated with a strip of barrier layer 56 and subsequently a primer layer 58. The non-PVC membrane 52 does not require a barrier layer, as it does not include plasticizers. But a strip of primer 58 is applied to the edge 62 of membrane 52 to improve adhesion to the PSA. The cover strip 10 is simply applied directly to the edge portions of the two membranes. The pressure-sensitive adhesive 18 will bind to the primer layer 58 on the PVC layer and bond directly to the surface of the non-PVC membrane 52. Further the pressure-sensitive adhesive on the cover strip is protected from the plasticizers present in the PVC. Further, no welding is required to form any bonds.

This has been a description of the present invention, along with the preferred method of practicing the present invention. The invention itself, however, should be defined only by the appended claims wherein we claim:

What is claimed is:

1. A PVC cover strip for sealing a transition to a PVC membrane on a roof, the PVC cover strip comprising:
   a PVC layer having a first surface and a second surface and defining opposing edges across a width, the first surface configured to be exposed to weather;
   a barrier layer coating the second surface, the barrier layer being effective to prevent chemical migration from the PVC layer from passing through the barrier layer;
   a primer layer coating the barrier layer; and
   a pressure-sensitive adhesive layer coating the primer layer and extending from one edge of the PVC layer to the opposing edge of the PVC layer across the width,
   wherein the barrier layer is an acrylonitrile rubber.

2. The cover strip of claim 1 wherein the primer layer is bromobutyl rubber or is based on at least one of butyl, polyisobutylene, or halobutyl polymers with reduced solids content relative to pressure sensitive adhesive layer.

3. The cover strip of claim 1 wherein the pressure sensitive adhesive is bromobutyl rubber or based on at least one of butyl, polyisobutylene, or halobutyl polymers.

4. The cover strip of claim 1 wherein the PVC layer is 6 inches to 12 inches wide, and the pressure-sensitive adhesive layer and the primer layer extend from one edge to an opposing edge of the PVC layer.

5. The cover strip of claim 1 wherein the barrier layer is effective to prevent plasticizer migration.

6. The cover strip of claim 1 wherein the barrier layer is 0.167 mils to 2.5 mils thick.

7. The cover strip of claim 1 wherein the primer layer is 0.2 mils to 0.6 mils thick.

8. An edge treatment for a roof comprising the PVC cover strip of claim 1.

9. A roof surface comprising the edge treatment of claim 8.

10. A method of manufacturing a PVC cover strip for sealing a transition to a PVC membrane on a roof, the method comprising:
    applying a barrier layer of an acrylonitrile rubber to a PVC layer having a first surface and a second surface and defining opposing edges across a width, the first surface configured to be exposed to weather; the barrier layer coating the second surface and being effective to prevent chemical migration from the PVC layer from passing through the barrier layer;
    allowing the barrier layer to set;
    coating the set barrier layer with a primer layer defining opposing edges across a width;
    allowing the primer layer to set; and
    laminating the set primer layer with a pressure-sensitive adhesive layer and a release sheet,
    wherein following laminating, the pressure-sensitive adhesive layer extends from one edge of the PVC layer to an opposing edge of the PVC layer across the width.

11. The method of claim 10 wherein the PVC layer is 6 inches to 12 inches wide and wherein, following laminating, the primer layer extends from one edge to the opposing edge of the PVC layer.

12. The method of claim 10 wherein coating the set barrier layer includes providing 0.167 mils to 2.5 mils thick of the set barrier layer.

13. The method of claim 10 wherein coating the set barrier layer includes providing a thickness effective to prevent plasticizer migration.

14. The method of claim 10 wherein coating the set barrier layer includes providing a thickness of the set primer layer of 0.2 mils to 0.6 mils.

15. The method of claim 10 wherein the pressure sensitive adhesive layer is bromobutyl rubber or based on at least one of butyl, polyisobutylene, or halobutyl polymers.

\* \* \* \* \*